United States Patent [19]

Spears

[11] 4,353,171
[45] Oct. 12, 1982

[54] PROFILE PATTERN FOR A WEIR
[75] Inventor: A. Barry Spears, Lebanon, Tenn.
[73] Assignee: J. R. Wauford and Company, Consulting Engineers, Inc., Nashville, Tenn.
[21] Appl. No.: 264,025
[22] Filed: May 15, 1981
[51] Int. Cl.³ ............................ G01B 5/00; G01B 5/20
[52] U.S. Cl. ............................. 33/174 G; 33/174 PA; 33/175
[58] Field of Search .......... 33/174 G, 174 L, 174 PA, 33/175, 176

[56] References Cited
U.S. PATENT DOCUMENTS

| 164,343 | 6/1875 | Tiffany | 33/175 |
|---|---|---|---|
| 889,224 | 6/1908 | Haas | 33/175 |
| 2,083,841 | 6/1937 | Hall | 33/175 |
| 2,163,938 | 6/1939 | Dickson | 33/175 |
| 2,949,674 | 8/1960 | Wexler | 33/175 |
| 3,483,629 | 12/1969 | English | 33/175 |
| 3,983,632 | 10/1976 | Halstead | 33/174 PA |

FOREIGN PATENT DOCUMENTS
1319083  1/1963  France ..................... 33/175

Primary Examiner—Richard R. Stearns
Attorney, Agent, or Firm—Harrington A. Lackey

[57] ABSTRACT

A weir pattern device including an elongated body and one or more elongated wing members telescopingly received on said body for adjusting the length of the pattern device to span the width of a flow channel for which a weir is to be made, a plurality of parallel vertical profile rods mounted on the body and the wing members for vertical positioning so that the bottom ends of the profile rods engage the contoured bottom surface of the flow channel, in operative position. The pattern device further includes at each end, a pivotally mounted foot or shoe member adapted to bear against the corresponding sides of the channel. These shoe members may include an elongated upright bearing piece of moldable or plastic material for conforming to the side surface of the channel.

10 Claims, 7 Drawing Figures

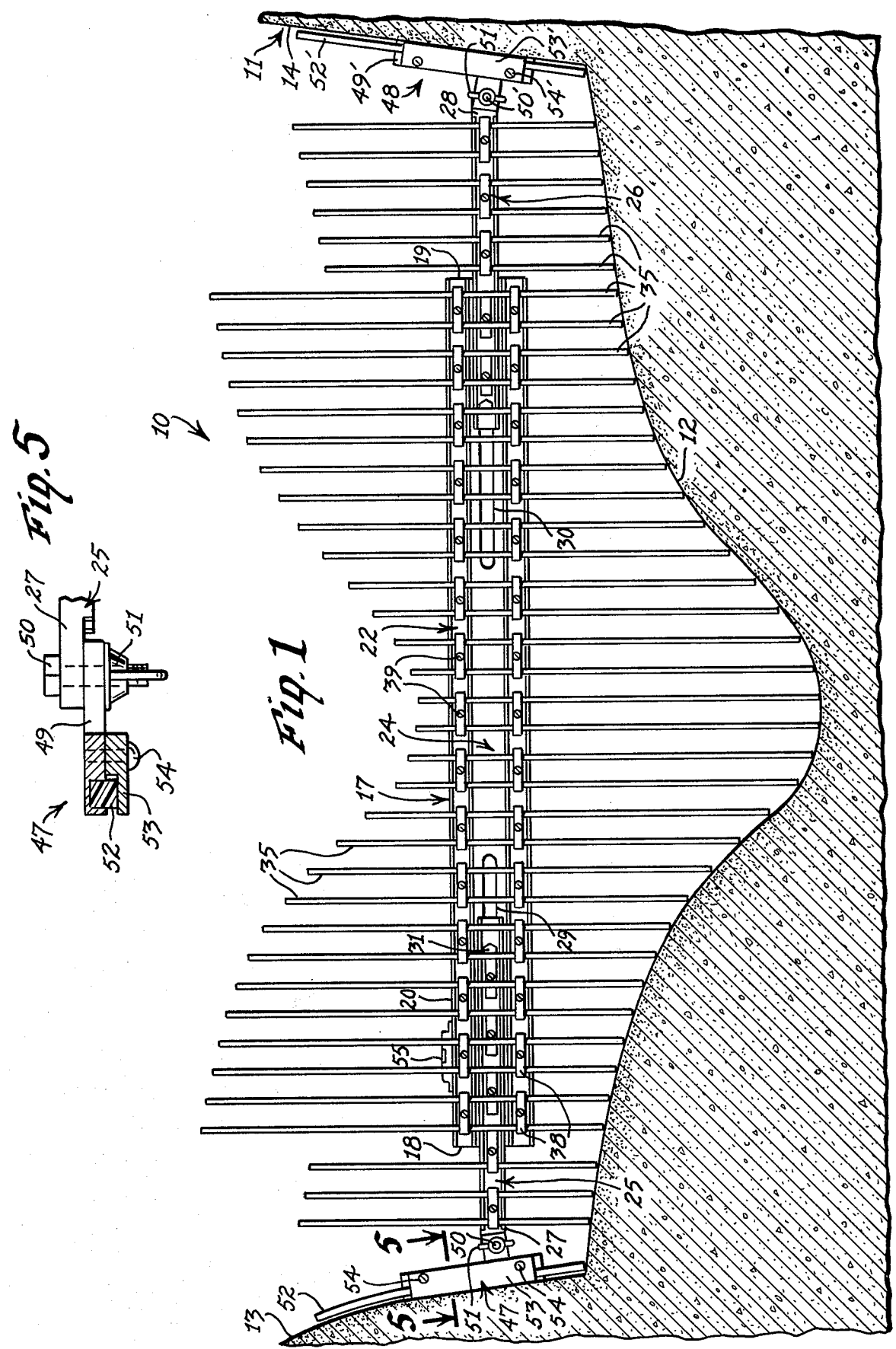

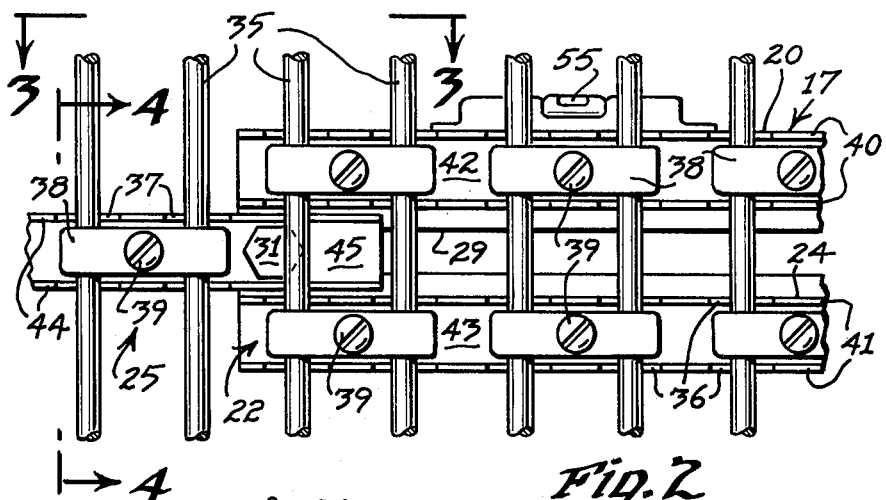
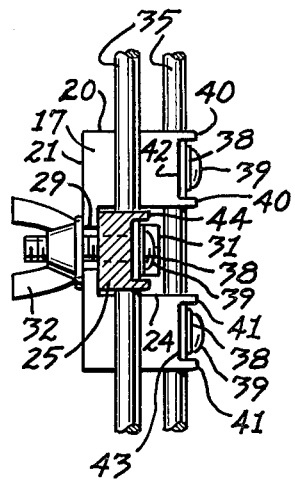
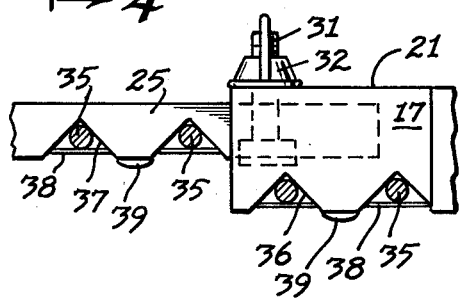
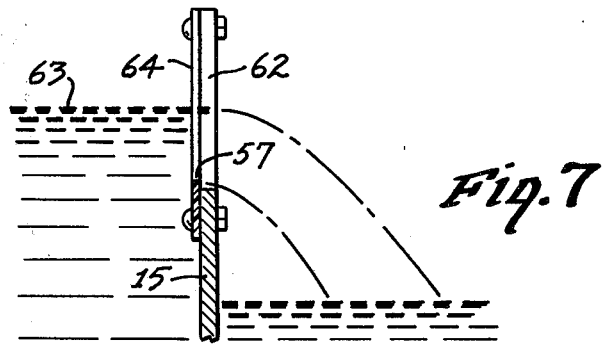
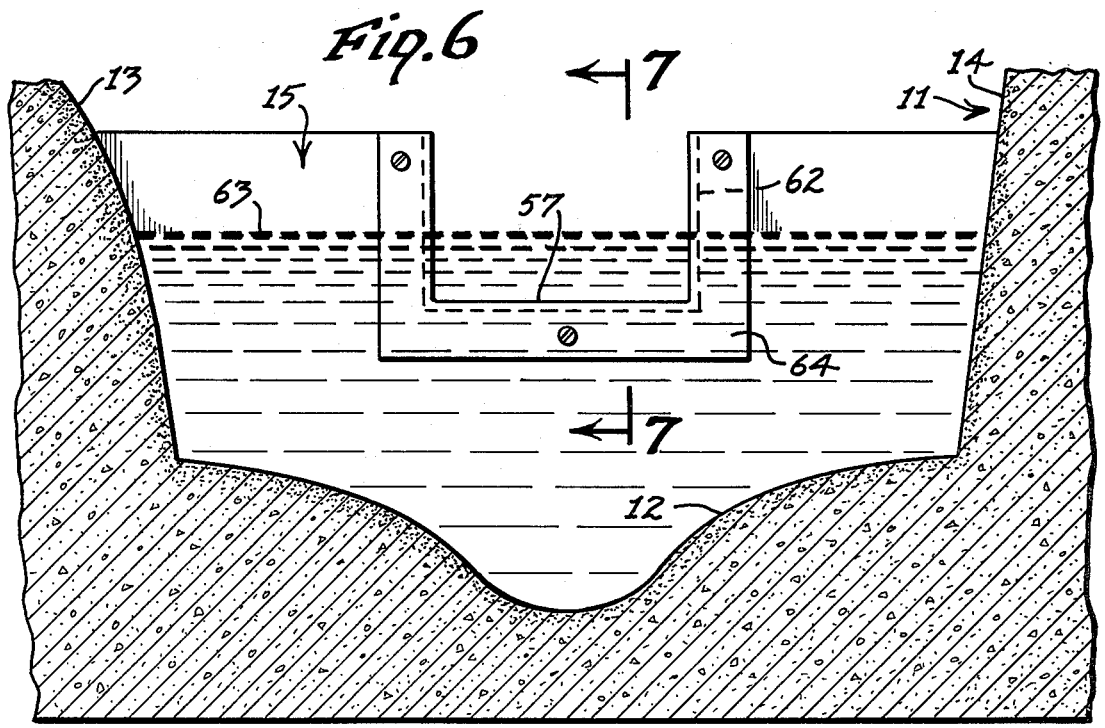

PROFILE PATTERN FOR A WEIR

Background of the Invention

This invention relates to a pattern for making a weir to fit a particular liquid flow channel, and more particularly to a weir pattern adapted to conform to the bottom and side surfaces of a liquid flow channel, such as a sewer.

Profile gauges or transfer devices are well known in the art as illustrated in the following U.S. Pat. Nos.:

1,261,438, Reinhardt, Apr. 2, 1918
2,083,841, Hall, June 15, 1937
2,163,938, Dickson, June 27, 1939
2,266,457, Wolff, Dec. 16, 1941
2,621,415, Cooper, Dec. 16, 1952
2,949,674, Wexler, Aug. 23, 1960
3,483,629, English, Dec. 16, 1969
3,678,587, Madden, July 25, 1972

Although all of the above patents disclose various types of profile gauges or transfer devices having a plurality of parallel profile needles, pins, or rods, supported in an elongated frame for slidable adjustable movement transversely of the frame, so that the operating ends of the rods may conform to the contour of a particular surface, nevertheless none of the above patents disclose a profile rod frame or body having longitudinally adjustable or telescoping sections, much less a telescoping or wing section supporting its own set of profile rods.

Moreover, none of the above patents disclose any means for supporting the opposite ends of the profile frame against opposed side surfaces of a flow channel, much less pivotally mounted feet or shoes for engaging the opposite side surfaces, while the profile rods engage the bottom surface.

Furthermore, none of the above patents disclose any type of pattern for conforming to the side surfaces and the bottom surfaces of a liquid flow channel for the purpose of accurately constructing a weir to precisely fit that flow channel.

SUMMARY OF THE INVENTION

It is therefore an object of this invention to provide a weir pattern including a plurality of vertical profile rods adjustably mounted upon the body of the device and upon one or more wing sections longitudinally adjustable relative to the body, for precisely determining the contour of the bottom surfaces of liquid flow channels of varying shapes and widths.

Furthermore, it is an object of this invention to provide a weir pattern adjustable in length and having pivotal foot members at its opposite ends for engaging the opposite side surface of a flow channel, and a plurality of vertically adjustable profile rods for determining the bottom surface or invert of the liquid flow channel.

It is also an object of this invention to provide adjustable means in a weir pattern not only to conform to the bottom surfaces of various shapes of a flow channel, but also to accommodate and conform to the side surfaces of the flow channel, creating an accurate pattern for making a weir to fit the flow channel.

More specifically, the weir pattern preferably includes an elongated body having means for slidably receiving, for longitudinal movement, a wing member for longitudinal projection from one end of the body, and preferably a second wing member slidably received for projecting from the opposite end of the body. Both the wing members and the body have retainer means for adjustably and vertically positioning parallel and vertical profile rods, without interfering with the longitudinal adjustable capability of the wing members relative to the body. The opposite ends of the pattern, and preferably the opposite free ends of a pair of wing members, are pivotally connected to corresponding foot or shoe members adapted to engage the opposite side surfaces of the flow channel when the pattern device is in its operative position, with the profile rods engaging the bottom surface of the flow channel. One of the shoe or foot members may include a plastic or moldable elongated upright side bearing piece adapted to be molded or shaped to engage and conform to the contour of the corresponding side surface of the flow channel.

BRIEF DESCRIPTION OF THE DRAWINGS

FIG. 1 is a front elevation of a weir pattern made in accordance with this invention in its operative position in a liquid flow channel in which the pattern device is engaging the bottom surface and the opposite side surfaces of the channel;

FIG. 2 is a greatly enlarged, fragmentary, front elevation of the left end portion of the body of the pattern device disclosed in FIG. 1, supporting the left wing member in an expanded or projected position;

FIG. 3 is a fragmentary section taken along the line 3—3 of FIG. 2;

FIG. 4 is a fragmentary section taken along the line 4—4 of FIG. 2;

FIG. 5 is an enlarged fragmentary section taken along the line 5—5 of FIG. 1;

FIG. 6 is a front elevation of a weir made from the pattern disclosed in FIG. 1, and fitted in the liquid flow channel shown in section; and FIG. 7 is a fragmentary section taken along the line 7—7 of FIG. 6.

DESCRIPTION OF THE PREFERRED EMBODIMENTS

Referring now to the drawings in more detail, FIG. 1 discloses a pattern device 10 made in accordance with this invention, in operative position, fitted within a liquid flow channel 11 and engaging the contoured bottom surface 12 and side surfaces 13 and 14 of the channel 11.

FIG. 6 discloses a weir 15 fitted in a flow channel 11 of which the transverse contour was obtained by the pattern device 10.

The pattern device 10 includes an elongated, essentially rectangular, body or frame 17 having left and right end portions 18 and 19 an elongated horizontal flat or planar top surface 20, a rear surface 21 and generally a front face 22.

Formed longitudinally in the middle of and extending the full length of the body 17 is an elongated guideway or channel 24 which opens through the front face of the body 17.

Adapted to be slidably received longitudinally of the channel 24 is at least one, and preferably two elongated wing members, such as the left wing member 25 and the right wing member 26. Each of the respective wing members 25 and 26 is provided with a free end portion 27 and 28, respectively, which normally projects longitudinally beyond the respective end portions 18 and 19 of the body 17, in operative position.

Also, extending longitudinally of the body 17 in the rear wall of the channel 24 are elongated slots 29 and 30 at the left and right end portions of the body 17, respectively. A bolt 31 extends through the wing member 24, and then through the elongated slot 29, where it is secured in place by a wing nut 32. By loosening or tightening the wing nut 32 on the bolt 31, the left wing member 25 may be longitudinally adjusted to any desired longitudinal position relative to the body 17. The right wing member 26 is likewise adjusted relative to the slot 30 by a bolt 31, the left wing member 25 may be longitudinally adjusted to any desired longitudinal position relative to the body 17. The right wing member 26 is likewise adjusted relative to the slot 30 by bolt and wing nut identical to the bolt 31 and wing nut 32, but not shown.

Mounted in various adjusted vertical positions, along the body 17 and the wing members 25 and 26 are a plurality of vertical parallel profile rods 35. These profile rods are received in longitudinally spaced sets of vertically aligned V-shaped notches 36 in the body 17 and V-shaped notches 37 in the wing members 25 and 26. The profile rods 35 are held in their respective notches 36 and 37 by retainer means in the form of elongated elastic retainer bags or spring plates 38. As disclosed in the drawings, and particularly in FIG. 2, each spring retainer plate 38 is long enough to span a pair of profile rods 35, and is held in that position by a retainer screw 39. The screws 39 are tightened just sufficiently to hold the respective profile rods 35 in their adjusted positions, yet loose enough, or biased sufficiently, that any profile rod 35 may be manually forced up or down within its respective set of notches 36 or 37. The retainer plates 38 and screws 39 are uniform and are used both on the body 17 as well as on the respective wing members 25 and 26.

It will be noted, particularly in FIGS. 2 and 4, that the front-to-rear dimension of the channel 24 is sufficiently greater than the front-to-rear dimension of each wing member 25 and 27, that the respective wing members 25 and 26 may be easily moved longitudinally within the channel 24 behind the profile rods 35 supported on the body 17, without any interference with the body profile rods 35.

In order to prevent the spring plates 38 from inadvertently rotating out of their horizontal disposition for spanning each pair of profile rods 35, the retainer plates 38 are longitudinally aligned and retained upon the front face 22 between pairs of longitudinally extending ridges 40 and 41. The ridges 40 are disposed above the channel 24 to form an elongated groove 42, while the lower ridges 41 form a longitudinal groove 43 below the channel 24. The grooves 42 and 43 actually constitute part of the front face 22.

In like manner, the retainer plates 38 on the wing members 25 and 26 are confined between ridges 44 defining an elongated groove 45.

Pivotally mounted on the free end portion 27 of the left wing member 25 is a shoe or foot member 47, and pivotally mounted on the free end portion 28 of the right wing member 26 is a foot member 48 of identical construction. The foot members 47 and 48 are designed to be pivotally adjustable with respect to the respective wing members 25 and 26 in order to bear against the corresponding side surfaces 13 and 14 of the flow channel 11.

In a preferred form of the construction, the foot member 47 includes a base or carrier 49 pivotally connected to the free end portion 27 by a pivot bolt 50 and wing nut 51 (FIG. 5). Carried by the base 49 is an elongated upright bearing piece 52 made of plastic or moldable material, without a memory, so that when it is shaped to conform to the particular contour of the corresponding side surface 13, it will retain that shape. Clamp member 53 is secured to the base or carrier 49 by a screw 54 in order to hold the bearing piece 52 in its vertically adjusted position.

Since the foot member 48 is disclosed as being constructed identically to the foot member 47, corresponding parts are shown by the correspondingly primed numerals.

As shown in FIG. 1, since the side surface 13 is curved, the bearing piece 52 is also curved along the same contour. However, since the right side surface 13 of the flow channel 11 is generally straight, but at an angle to the horizontal, the bearing piece 52' is straight, but the foot member 48 is pivoted relative to the wing member 26 at the same angle to the horizontal as the side surface 14.

A bubble level 55 is preferably attached to the top surface 20 of the body 17 so that when the pattern device 10 is fitted within the channel 11, the top surface 20 may be adjusted until it is truely horizontal. Moreover, the top surface 20 of the body 17 is vertically adjusted relative to the profile rods 35 until the top surface is at an elevation from the bottom surface 12 of the channel equal to the elevation of the crest 57 (FIG. 6) of the weir 15 above the bottom surface 12 of the flow channel 11.

In utilizing the pattern device 10 for making a cross-sectional pattern of a liquid flow channel 11, the wing nuts 32 are loosened so that both wing members 25 and 26 may be constructed within the body 17. The longitudinal dimension of the body 17 is arranged transversely of the flow channel 11, and the profile rods 35 are manually depressed through their respective retainer elements or bars 38 until the bottom ends of the profile rods 35 engage the bottom surface 12 of the channel 11. Relative adjustment between the profile rods 35 and the body 17 is continued until the top surface 20 is at the desired crest height from the bottom 12 and the top surface 20 is truly horizontal as determined by the bubble level 15. With the bottom ends of all the profile rods 35 resting upon the bottom surface 12, the wing members 25 and 26 are then projected laterally until the respective foot members 47 and 48 engage the corresponding side surfaces 13 and 14. When the angle of the foot members 47 and 48 correspond to the side surfaces 13 and 14, the wing nuts 51 and 51' are tightened. Then the plastic or moldable bearing pieces 52 and 52' are manually shaped to conform to the corresponding side surfaces 13 and 14. The wing nuts 32 are tightened to maintain the wing members 25 and 26 in fixed relationship to the horizontal body 17. As previously mentioned, the profile rods 35 will remain in their vertically adjusted positions because of the spring tension in the retainer bars 38 as determined by the respective retainer screws 39.

After all of the above adjustments have been completed, which can occur in a relatively short space of time, the pattern device 10 is removed with the entire profile of the flow channel 11 determined for fabricating the weir 15, which will precisely conform with the side surfaces 13 and 14 and the bottom surface 12 of the liquid flow channel 11.

As disclosed in FIGS. 6 and 7, the weir 15 is provided with a weir slot 62 through which the water 63 is discharged. The slot 62 may be lined with a thin Plexiglass liner 64, if desired.

What is claimed is:

1. A weir pattern device for conforming to the profile of a liquid flow channel having a bottom surface and opposite side surfaces, comprising:
   (a) an elongated body having opposite first and second end portions,
   (b) at least one elongated wing member having a free end portion and an opposite end portion,
   (c) means on said body slidably receiving said wing member for relative longitudinal movement so that said free end portion may project beyond said first end portion in an operative position in which said body and said wing member extend transversely of a flow channel,
   (d) a plurality of elongated profile rods, each having a bottom end,
   (e) retainer means on said body and said wing member for receiving and holding said profile rods in slidably adjusted parallel vertical operative positions, so that when said body and said wing member are disposed in their transverse operative positions, said bottom ends may be positioned to engage the bottom surface of the channel, and
   (f) side bearing means mounted relative to said body for engaging the opposite side walls of the channel, in operative position.

2. The invention according to claim 1 in which said side bearing means comprise a first foot member pivotally connected to said free end portion and adapted to engage a corresponding side surface of the liquid flow channel in operative position, and a second foot member operatively connected to the second end portion of said body for engaging the corresponding opposite side surface of the flow channel, in operative position.

3. The invention according to claim 2 in which at least one of said foot members is pivotally connected to the free end portion of said wing member, and further comprising an elongated upright plastic bearing piece adapted to be shaped to engage the corresponding vertical contour of the corresponding side wall of the flow channel, said bearing piece being adjustably received within said foot member.

4. The invention according to claim 1 comprising first and second of said elongated wing members, said means slidably receiving said wing member comprising first means for slidably receiving said first wing member, and further comprising second means on said body slidably receiving said second wing member for relative longitudinal movement so that the free end portion of said second wing member projects beyond said second end portion in said operative position, said retainer means being on said body and said first and second wing members.

5. The invention according to claim 4 in which said side bearing means comprises a first foot member pivotally mounted upon the free end portion of said first wing member and adapted to engage the corresponding side surface of the flow channel, and a second foot member pivotally connected to the free portion of said second wing member and adapted to engage the opposite side surface of the flow channel, in operative position.

6. The invention according to claim 1 in which said means for slidably receiving said wing member comprises an elongated channel extending longitudinally of said body and receiving said wing member for longitudinal adjustable movement, and means for securing said wing member in said channel in a longitudinal adjusted position.

7. The invention according to claim 6 further comprising an elongated slot extending longitudinally through the back wall of said channel, said means for securing said wing member in said channel comprising a bolt member in said wing member extending through said slot and nut means connected to said bolt for locking said wing member in adjusted longitudinal positions.

8. The invention according to claim 6 in which said body has a front face, said retainer means on said body comprising retainer elements adapted to secure said profile rods in said vertical adjusted positions on said front face so that said profile rods are in front of said wing member received in said channel.

9. The invention according to claim 1 in which said retainer means on said body and said wing member comprise elongated elastic bars extending longitudinally of said body, each elastic bar spanning at least two profile rods, and means for securing each of said bars to the front face of said body.

10. The invention according to claim 9 further comprising vertically aligned grooves in the front face of said body and also in the front face of said wing member for vertically slidably receiving said corresponding profile rods.

* * * * *